Patented Oct. 26, 1926.

1,604,307

UNITED STATES PATENT OFFICE.

HENRY L. PRESTHOLDT, OF MINNEAPOLIS, MINNESOTA

CASEIN GLUE.

No Drawing.   Application filed April 17, 1922.  Serial No. 554,191.

My present invention provides a new composition of matter, herein designated as "casein glue", but which, from its broader aspect, is an adhesive composition adapted to be used, by itself or commingled with other substances, as an adhesive coating.

In this improved adhesive composition, casein is used as the adhesive base and is commingled with calcium hydroxide, sodium fluoride, tri-sodium phosphate, calcium chloride, and oil. The best results are obtained by using three oils, towit: hydrocarbon oil, oil citronella and turpentine.

I have obtained a very highly efficient glue or adhesive by using the above noted substances in accordance with the following formula:

|  | Parts. |
|---|---|
| Casein | 50 to 75 |
| Calcium hydroxide | 10 to 20 |
| Sodium fluoride | 1 to 12 |
| Tri-sodium phosphate | 1 to 15 |
| Calcium chloride | 1 to 7 |
| Hydrocarbon oil | 1 to 4 |
| Oil citronella | 1 to 4 |
| Turpentine | 1 to 4 |

The above noted substances, except the oils are commingled in dry powdered form and the oils commingled therewith are in such small quantity that they do not make the powdered mass pasty but keep the same from getting into dust form. The adhesive qualities and strength of the above composition will be greatest when the casein used has been precipitated by the lactic acid process.

This adhesive composition is sold in dry or powdered form and, when it is to be used, it will be introduced into water to form an emulsion, and it is then, of course, that the chemical reactions, that develop the adhesive qualities of the composition, will take place. After these reactions have taken place, the emulsion is adapted to be used as glue or as a coating or to be commingled with other substances, such as paint or calcimine, which contain certain color pigments. When desired, however, the color-producing pigments may be commingled with the dry composition. When the composition is to be used simply as a glue, no additions to the formula given, except water, will be required.

Casein provides the colloids of the adhesive. Calcium hydroxide unites with casein, forming a calcium caseinate, giving to the glue waterproof qualities. Sodium fluoride is a solvent for casein but, alone, it has the tendency of hastening the formation of nitrogen by introducing tri-sodium phosphate, which is also a casein solvent, but acting in conjunction with sodium fluoride, it has the tendency to retard the formation of nitrogen. Calcium chloride is a casein solvent, increasing the fluidity of the adhesive. The hydro-carbon oil and turpentine, when combined in the dry glue powder, have the quality of preventing calcium hydroxide from turning into a calcium carbonate. This is an addition to the claim that it prevents the formation of dust and other objectionable features. The oil of citronella performs the function of imparting an agreeable odor to the glue mixture.

What I claim is:—

1. An adhesive compound comprising the following ingredients in substantially the proportions stated, towit:

|  | Parts. |
|---|---|
| Casein | 50 to 75 |
| Calcium hydroxide | 10 to 20 |
| Salt of hydro-fluoric acid | 1 to 12 |
| Tri-sodium phosphate | 1 to 15 |
| Calcium chloride | 1 to 7 |

2. An adhesive composition made in accordance with the following formula:

|  | Parts. |
|---|---|
| Casein | 50 to 75 |
| Calcium hydroxide | 10 to 20 |
| Sodium fluoride | 1 to 12 |
| Tri-sodium phosphate | 1 to 15 |
| Calcium chloride | 1 to 7 |
| Hydrocarbon oil | 1 to 4 |
| Oil citronella | 1 to 4 |
| Turpentine | 1 to 4 |

In testimony whereof I affix my signature.

HENRY L. PRESTHOLDT.